United States Patent [19]

Brophy, Sr. et al.

[11] 4,344,248

[45] Aug. 17, 1982

[54] AUTOMATIC HOOKSETTING FISHING ROD HOLDER

[76] Inventors: Hugh J. Brophy, Sr.; Hugh J. Brophy, Jr., both of 9 Garrison Ave., West Somerville, Mass. 02144

[21] Appl. No.: 159,929

[22] Filed: Jun. 16, 1980

[51] Int. Cl.³ .............................................. A01K 97/10
[52] U.S. Cl. ............................................. 43/15; 43/21.2
[58] Field of Search ...................... 43/15, 16, 17, 21.2

[56] References Cited

U.S. PATENT DOCUMENTS

| | | | |
|---|---|---|---|
| 693,071 | 2/1902 | Ruud | 43/15 |
| 2,898,697 | 8/1959 | Housman | 43/15 |
| 2,995,855 | 8/1961 | Bell | 43/21.2 |
| 3,284,943 | 11/1966 | Wedel | 43/15 |
| 3,780,466 | 12/1973 | Hadnot | 43/17 |
| 3,862,508 | 1/1975 | Morgan | 43/17 |
| 3,874,107 | 4/1975 | Wheaton | 43/17 |
| 3,881,269 | 5/1975 | Timmons | 43/15 |
| 4,231,178 | 11/1980 | Black | 43/21.2 X |

FOREIGN PATENT DOCUMENTS

| | | | |
|---|---|---|---|
| 488788 | 12/1952 | Canada | 43/15 |
| 793626 | 4/1958 | United Kingdom | 43/15 |

*Primary Examiner*—Stephen G. Kunin
*Assistant Examiner*—Robert P. Olszewski
*Attorney, Agent, or Firm*—Joseph S. Iandiorio

[57] ABSTRACT

An automatic hooksetting fishing rod holder including a mounting member formed of a strap including a stake section; a pivot carried by the mounting member; a holder arm member pivotably connected to the pivot and including a forward portion extending on one side of the mounting member for engaging a fishing rod handle; a spring interconnected between the mounting member and the holder arm member to urge the forward portion of the holder arm upwardly; and a latch including a pawl pivotably attached to one of the members and a pawl engaging seat on the other of the members for restraining upward motion of the forward portion of the holder arm member until a downward force on the forward portion disengages the pawl and seat.

1 Claim, 8 Drawing Figures

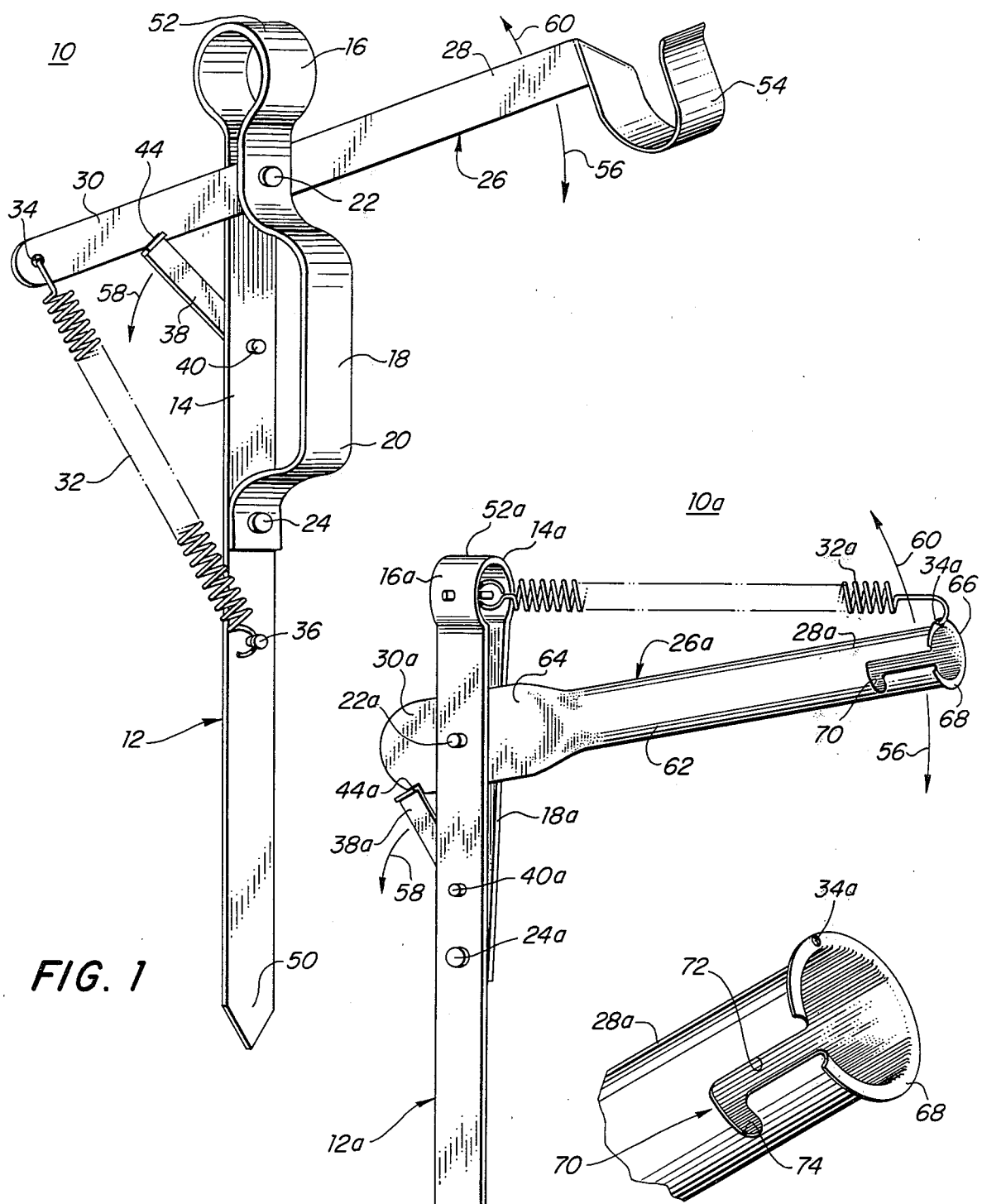

AUTOMATIC HOOKSETTING FISHING ROD HOLDER

FIELD OF INVENTION

This invention relates to an automatic hooksetting fishing rod holder.

BACKGROUND OF INVENTION

During the long periods usually devoted to the sport of fishing, avid fishermen often desire and need a break from holding the fishing rod, and fishing rod holders are offered for this purpose. Very often a strike while the rod is in a holder results in loss of the fish because the fisherman is not available to move the rod and set the hook. A number of hooksetting rod holders have been designed for this purpose. Typically they are quite complex and require a large number of parts. In addition, a number of them require that the fishing line be fed through, wrapped around or otherwise engaged with a trigger mechanism which trips when a fish strikes and exerts a slight tug outwardly and downwardly on the line. The mechanism when tripped responds by swinging the rod abruptly upward to set the hook.

SUMMARY OF INVENTION

It is therefore an object of this invention to provide an improved, inexpensive and easy to use automatic hooksetting fishing rod holder which is simple and inexpensive.

It is a further object of this invention to provide such an automatic hooksetting fishing rod holder which in one form provides an interlock to retain the fishing rod.

The invention features an automatic hooksetting fishing rod holder which has a mounting member formed of a strap including a stake section. There are pivot means carried by the mounting member and a holding arm member pivotably connected to the mounting member at the pivot means and including a forward portion extending on one side of the mounting member for engaging a fishing rod handle. Spring means interconnect the mounting member and the holder arm member to urge the forward portion of the holder arm upwardly. Latching means including a pawl pivotably attached to one of the members and a pawl-engaging seat on the other of the members restrains upward motion of the forward portion of the holder arm member until a downward force on the forward portion disengages the pawl and seat.

The pawl may be attached to the mounting member and the seat to the holder arm member, or conversely. Similarly the spring means may be attached to the forward portion of the holder arm member and a point on the mounting member above the pivot means, or the spring may be attached to the other end of the holder arm member and a point on the mounting member below the pivot means. The pawl may be pivotably attached to the forward portion of the holder arm member, whereupon the seat is on the mounting member above the pivot means; or the pawl may be mounted to the mounting member above the pivot means and the seat may be carried by the forward portion of the holder arm member. The pawl may also be pivotably attached to the mounting member below the pivot means with the seat on the other end of the holder arm member, or the pawl may be pivotably attached to the other end of the holder arm member and the seat may be carried by the mounting member below the pivot means. The mounting member may include a loop section at the top of the stake section, and a return section extending from the loop section along the stake section. The holder arm member may include a support member on the forward portion for supporting the handle of a fishing rod, and there may be a second loop on the mounting member for receiving another portion of the fishing rod. Alternatively, the holding arm member may include a tube which receives the handle of the fishing rod. The tube may include an interlock having an axial slot extending inwardly from the forward end to a circumferential slot segment for gripping a portion of the reel on the fishing rod.

DISCLOSURE OF PREFERRED EMBODIMENT

Other objects, features, and advantages will occur from the following description of a preferred embodiment and the accompanying drawings, in which:

FIG. 1 is an axonometric view of an automatic hooksetting fishing rod holder according to this invention;

FIG. 2 is a view similar to FIG. 1 of an alternative automatic hooksetting fishing rod holder according to this invention;

FIG. 3 is an enlarged detail axonometric view of the forward end of the forward portion of the holder arm member of FIG. 2;

Figure 6:
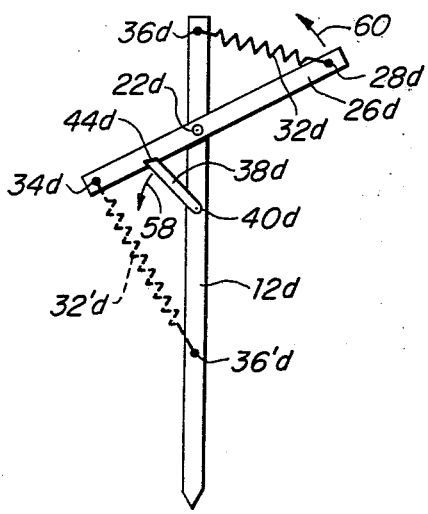
Figure 7:
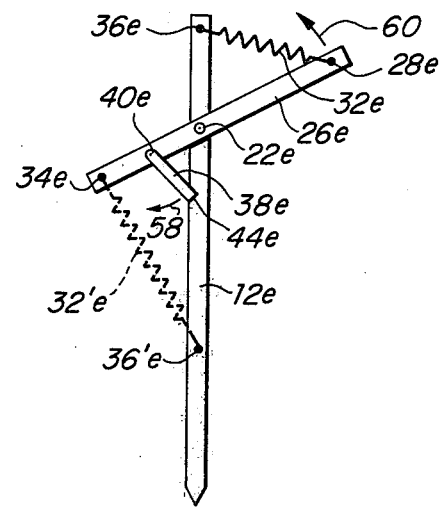
Figure 8:
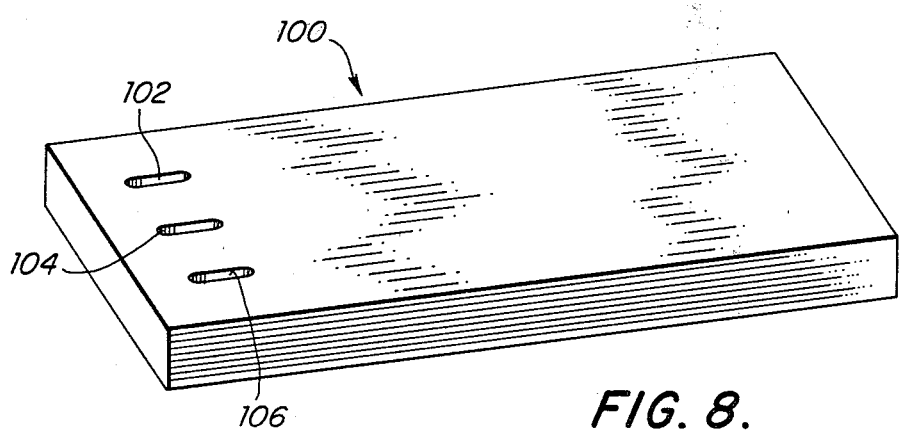

FIGS. 4, 5, 6, and 7 are schematic drawings of various arrangements of the pawl and pawl seat and spring with respect to the mounting member and holding arm member; and FIG. 8 is an axonometric view of a mounting plank usable with the holder of this invention.

An automatic hooksetting fishing rod holder according to this invention may be effected using a mounting member formed of a strap, such as a metal strap, bent to form a stake section. Preferably there is a loop section at the top of the stake section and a return section which extends from the loop partway down the stake section. Pivot means carried by the mounting member may be mounted at the bottom of the loop member to fasten the stake section and return section together. A holder arm member is pivotably connected to this mounting member at the pivot means, and may include a strap of metal or plastic. The arm includes a forward portion which extends on one side of the mounting member for engaging a fishing rod handle, and may also include a semicircular hanger or support portion to engage the handle. A spring is interconnected between the other end of the holder arm member and the mounting member somewhere below the pivot means. Alternatively, the spring could be interconnected between the portion of the mounting member above the pivot means and the forward end of the holder arm member. A pawl is pivotably attached to the mounting member below the pivot means and engages with the seat on the other end of the holding arm member to prevent the forward end of the holding arm member from rotating upwardly. Alternatively, the pawl may be pivotably attached to the other end of the holder arm member and the pawl seat may be carried by the mounting member. Also alternatively, the pawl and pawl seat may be carried one by the forward portion of the holder arm member and the other by the mounting member above the pivot means. Alternatively the holding arm member may have a tubular portion to receive the handle of the fishing rod, and may include an interlocking device which includes an axial slot extending inwardly from the forward end of the forward portion of the holding arm member and terminating in a circumferential slot segment for gripping a portion of the reel carried by the rod.

There is shown in FIG. 1 an automatic hooksetting fishing rod holder 10 which includes a mounting member 12 having a stake portion 14, loop 16, and return section 18 that is bent to form a second loop 20. Pivot means such as pin 22 fastens together stake section 14 and return section 18. A rivet or other fastening means 24 may be used to fasten the lower end of section 18 below loop 20 to stake section 14. Holder arm member 26 is pivotably attached at 22 to mounting member 12 and includes a forward portion 28 and rearward portion 30. Spring 32 is mounted in hole 34 in rearward portion 30 of holder arm member 26 and by means of screw 36 or similar fastening device to stake section 14. Pawl 38 is pivotably attached at 40 to stake section 14 and engages with pawl seat 44 on rearward portion 30 of holder arm member 26. The sharpened end 50 enables stake section 14 to be pushed into the ground by pressure applied on the top 52 of loop 16, which functions as a hand grip. The fishing rod handle is typically supported in loop 20 and in support band 54 with the reel between them.

A strike causes a tug on the line and the fishing pole exerts a downward force 56 on member 26 sufficient to permit pawl 38 to release from seat 44 and swing away in the direction indicated by arrow 58, whereupon under the urging of spring 30 the forward portion 28 of holding arm member 26 flies upwardly, in the direction of arrow 60, with the rod, causing the hook to set in the fish's mouth.

Alternatively, as shown in FIG. 2, where like parts have been given like numbers accompanied by a lower case a with respect to FIG. 1, holder arm member 26a includes forward end 28a which includes a tube 62 having a flattened portion 64. The forward end 66 of forward portion 62 includes a flange 68, FIG. 3, which contains hole 34a, and an interlock device 70, which includes an axial slot 72 that extends inward from end 68 and terminates in a circumferential slot segment 74. The fishing pole is inserted in tube 62 and then twisted slightly so that the reel mounting interlocks with slots 72 and 74.

Although thus far FIGS. 1, 2, and 3, the pawl and pawl seat are disposed below the pivot means 22 and on the rearward end 30 of holding arm member 26, this is not a necessary limitation of the invention. They may be moved to other locations in the same manner as spring 32; all that is required is that spring 32 urge forward portion 28 in the direction of arrow 60 while pawl 38 and pawl seat 44 oppose that motion when properly engaged.

Figure 4:
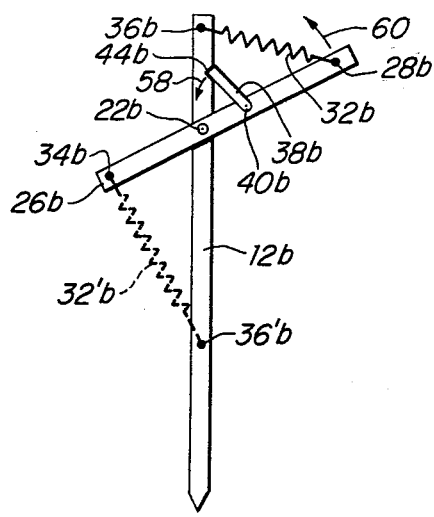
Figure 5:
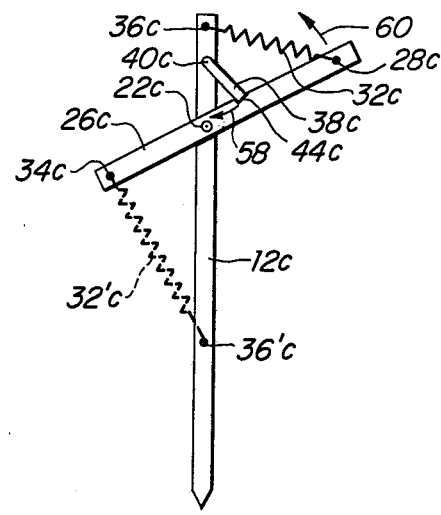

As shown in FIG. 4, pawl 38b may be pivotably mounted at 40b on holder arm member 26b to engage with pawl seat 44b on mounting member 12b, and spring 32 may be either in the position shown at 32b or 32'b. In FIG. 5, pawl 38c is pivotably mounted at 40c on mounting member 12c while pawl seat 44c is carried by holder arm member 26c; spring 32 may either be in the position shown at 32c or at 32c'. In FIGS. 4 and 5 pawl 38 and pawl seat 44 are mounted one on the forward portion of holding arm member 26, the other on mounting member 12 above pivot point 22, but this is not a necessary limitation on the construction. For example, as shown in FIG. 6, pawl 38d may be pivotably mounted at 40d below pivot means 22d on mounting member 12d, and pawl seat 44d may be carried by the other or rearward portion of holding arm member 26d; or as shown in FIG. 7, pawl 38e may be pivotably mounted at 40e on the rearward portion of holding arm member 26e while pawl seat 44e is carried by mounting member 12e below pivot means 22e; spring 32 may be in either position as shown in 32'd or 32d, and 32'e or 32e, FIG. 6 and 7 respectively.

Holder 10 is illustrated throughout with a stake portion for penetrating into the ground but this is not the only way to secure it. It may be clamped to a boot or dock or it may be accompanied by a mounting board 100, FIG. 8, having three holes 100, 104, 106 to receive the end 50 of stake section 14. One holder is inserted in hole 104, and two are inserted in holes 102 and 106 for balance.

Other embodiments will occur to those skilled in the art and are within the following claims.

What is claimed is:

1. An automatic hooksetting fishing rod holder comprising:

a mounting member formed of a single continuous strap including a stake section, a first loop section at the top of said stake section for providing a handgrip for inserting and removing said stake section, and a return section extending from said first loop section along said stake section, pivot means carried by said mounting member and a second loop formed integrally in said strap below said pivot means for receiving a portion of the fishing rod handle;

a holder arm member pivotably connected to said mounting member at said pivot means and including a forward portion extending on one side of said mounting member for engaging a fishing rod handle;

spring means interconnected between said mounting member and said holder arm member to urge said forward portion of said holder arm upwardly; and latching means including a pawl pivotably attached to one of said members for restraining upward motion of said forward portion of said holder arm member until a downward force on said forward portion disengages said pawl and seat.

* * * * *